(12) United States Patent
Shea

(10) Patent No.: US 7,195,034 B2
(45) Date of Patent: Mar. 27, 2007

(54) FLUID TRIM APPARATUS AND METHOD

(75) Inventor: Allan K. Shea, Erie, PA (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/183,898

(22) Filed: Jul. 19, 2005

(65) Prior Publication Data

US 2007/0017584 A1    Jan. 25, 2007

(51) Int. Cl.
*F16K 47/08* (2006.01)

(52) U.S. Cl. .................... 137/625.37; 138/42

(58) Field of Classification Search ............ 137/625.3, 137/625.33, 625.37, 625.38, 625.39; 138/42; 251/118
See application file for complete search history.

(56) References Cited

U.S. PATENT DOCUMENTS

| | | | |
|---|---|---|---|
| 3,690,344 A | 9/1972 | Brumm | 137/625.28 |
| 4,025,432 A * | 5/1977 | Nolan et al. | 210/222 |
| 4,105,048 A | 8/1978 | Self | 138/42 |
| 4,127,146 A | 11/1978 | Self | 137/625.3 |
| 4,267,045 A | 5/1981 | Hoof | 210/322 |
| 4,279,274 A | 7/1981 | Seger | 138/42 |
| 4,410,430 A * | 10/1983 | Hagler, Jr. | 210/446 |
| 4,429,714 A * | 2/1984 | Hughes et al. | 137/625.3 |
| RE32,197 E | 7/1986 | Self | 251/127 |
| 4,759,000 A | 7/1988 | Reitz | 367/176 |
| 5,261,453 A | 11/1993 | Hekkert et al. | 137/625.38 |
| 6,039,076 A | 3/2000 | Hemme et al. | 137/625.37 |
| 6,739,426 B2 | 5/2004 | Sherikar et al. | 181/248 |

FOREIGN PATENT DOCUMENTS

| | | |
|---|---|---|
| JP | 03 194273 A | 8/1991 |
| JP | 08 247336 A | 9/1996 |
| WO | WO 00/09923 | 8/1999 |

* cited by examiner

*Primary Examiner*—John Fox
(74) *Attorney, Agent, or Firm*—Baker & Hostetler LLP

(57) ABSTRACT

A noise reducing apparatus and method for handling of fluid comprises a plurality of discs stacked on one another, each disc having a radially inner periphery and a radially outer periphery, and a plurality of fluid flow channels defined on at least some of the discs and extending from the inner periphery to the outer periphery. One or more sound reducing material elements are disposed to extend across at least some of the fluid flow channels so that fluid flowing through the channel passes through the sound absorbing material. Alternatively, a plurality of sound absorbing wafers are disposed in between adjacent discs and form a respective wall of the flow channels with respect to the flow channel of an adjacent disc.

20 Claims, 3 Drawing Sheets

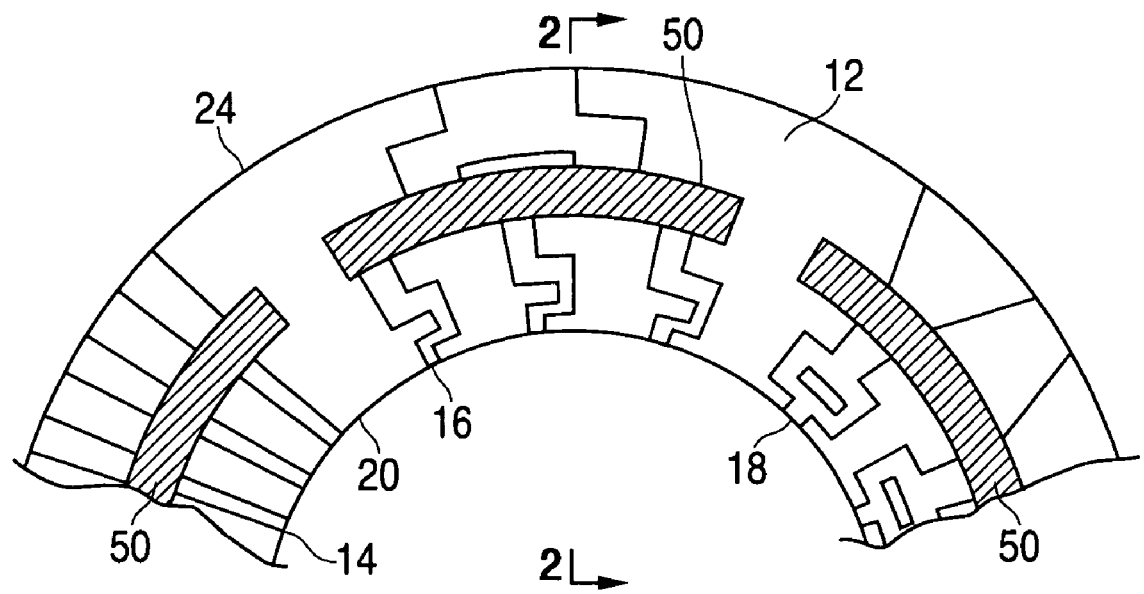
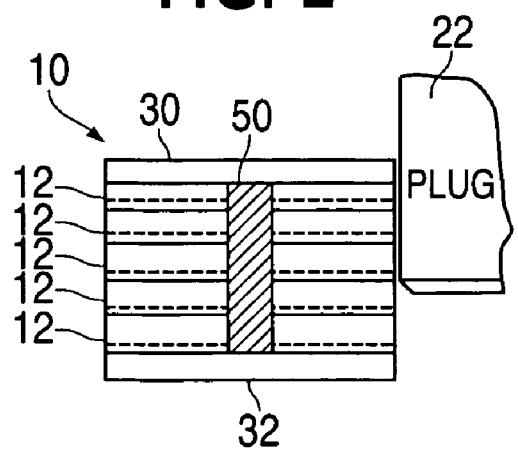

FLUID TRIM APPARATUS AND METHOD

FIELD OF THE INVENTION

The present invention relates generally to the field of fluid handling and acoustics, and more particularly pertains to devices and methods that can be used as a control valve and/or noise reducer that reduces fluid pressure, controls velocity of a fluid, and/or reduces noise that is generated by the fluid velocity in valve and fluid control operations. The present invention thus relates to noise control in valves, trims and/or flow controllers.

BACKGROUND OF THE INVENTION

There are a wide number of applications in industry and elsewhere where fluid is controlled within a gas or hydraulic system of some type. These fluid handling systems often involve valves which may regulate flow, not only from an on/off standpoint, but also provide intermittent flow modulation. In particular, flow control devices are known that are used in high pressure applications and typically include a valve trim which is a sort of flow restrictor. Valve trims can provide several advantages, particularly in the case of high pressures.

Typical valve trims are comprised of a single orifice, where the pressure is reduced in a single stage of pressure drop. Although the invention has applications with both compressible and non-compressible fluid flow, the major source of valve noise is aerodynamic noise in compressible fluid systems. Aerodynamic noise is noise generated from having Reynolds stresses or shear forces in a turbulent flow stream resulting from deceleration, expansion, or impingement. The principal area of noise generation in a control valve is the recovery region immediately downstream of the vena contracta, where the flow field is characterized by intense mixing and turbulence.

The best way to reduce valve generated noise is to reduce noise at the source, which is at the valve trim. Disc stack technology has provided several advantages over standard single stage valve trim with regard to noise reduction in a fluid handling system. One advantage that disc stack technology provides is the design uses multi-path flow geometry, where the flow stream is subdivided into many small paths. The fluid energy at the outlet of many small flow paths is much lower than at the outlet of a single large flow path of equivalent area. Multi-path trim designs are known to provide noise levels that are up to 15 dBA lower than standard trim. Another advantage is that the flow paths are configured to have a multistage pressure drop. This reduces the turbulence and energy release at each stage, reducing the overall generated noise. Disc stack valves also control fluid velocity, which is a noise generator in all fluid systems, and typically have an expanding flow path to reduce velocity and allow for fluid expansion.

The characteristic of disc stack trims for having a gradual pressure decrease is beneficial in permitting a valve to move between open, closed and intermediate flow positions without subjecting the entire system to excessive shocks. Another benefit of known valve trims is that they can provide noise attenuation within the fluid handling system. By gradually reducing the flow pressure in multiple stages over the valve trim area, the valve trims have proven very effective in reducing noise.

The geometry of the fluid path that is formed can take on a variety of configurations. The individual discs are assembled to create the so-called "disc stack" trims where a fluid restrictor is provided in connection with a valve. In one type of arrangement, a disc stack having a number of convoluted radial fluid paths is provided with a control element in the form of a fluid restriction or a plug centrally moveably provided within the disc stack. The fluid restrictor or plug is moved within the disc stack to expose a greater or smaller number of fluid paths thus controlling the amount of fluid flow. In addition to creating less valve-generated noise, such disc stacks are capable of providing a benefit of silencing existing noise in a flow stream as well. Besides the use of disc stacks in connection with the valve itself, the stacks have also been used as a silencer placed down stream of a control valve or at the end of a pipeline where it is desirable to reduce fluid pressure in a quiet manner.

There are many known arrangements of disc stack technology in industry. In general, in these devices, the convoluted flow path is formed as a series of radial grooves in a single disc that are torturous in nature. A number of multi-path, multistage discs are stacked on top of one another to form a cylindrical shaped disc stack. As mentioned above, the paths in the disc can be blocked or exposed by a plug moveably disposed in the center of the layer of discs. Because the paths are torturous, in that they provide a number of obstacles, right angle turns, expansion in the flow path, and a relative long overall flow path which creates frictional resistance, the pressure in the fluid as it travels through the path is reduced in a way that controls the velocity of the fluid. Because high velocity fluid can be a source of noise generation, reduction in velocity reduces noise, and the fluid also exits the valve trim at a much lower velocity compared to if a single orifice were used, thus allowing the valve trim to provide quiet operation compared to a single orifice.

While the above described noise reducing systems have proven to be very successful, it would be desirable to have even lower noise generation performance than is provided by the known disc stacks. Accordingly, there is a need in the art for sound attenuation devices and methods that can provide enhanced performance and/or convenience of manufacture and use in some applications.

SUMMARY OF THE INVENTION

The foregoing needs are met, to a great extent, by the present invention, wherein in one aspect an apparatus is provided that in some embodiments provides enhanced noise reduction and/or pressure drop or other benefits.

In accordance with one embodiment of the present invention, a pressure reducing apparatus for handling of fluid comprises a plurality of discs stacked upon one another, each disc having a radially inner periphery and a radially outer periphery, and a plurality of fluid flow channels defined on at least some of the discs and extending from the inner periphery to the outer periphery; and one or more sound reducing material elements disposed in the disc stack to extend across at least some of the fluid flow channels so that fluid flowing through the channel passes through the sound absorbing material.

In accordance with another embodiment of the present invention, a pressure reducing apparatus for handling of fluid comprises a plurality of adjacent discs stacked upon one another, each disc having a radially inner periphery and a radially outer periphery, and a plurality of fluid flow channels defined on at least some of the discs and extending from the inner periphery to the outer periphery; and a plurality of sound absorbing wafers disposed in between at least some adjacent discs and forming a respective wall of at least a portion of the flow channels with respect to the flow channel of an adjacent disc.

In accordance with still another embodiment of the present invention, a pressure reducing apparatus for handling of fluid comprises a plurality of discs stacked upon one another, each disc having a radially inner periphery and a radially outer periphery, and a plurality of fluid flow channels defined on at least some of the discs and extending from the inner periphery to the outer periphery; and sound reducing means disposed in the disc stack to extend across at least some of the fluid flow channels so that fluid flowing through the channel passes through the sound absorbing material.

In accordance with yet another embodiment of the present invention, a pressure reducing apparatus for handling of a fluid comprises a plurality of adjacent discs stacked upon one another, each disc having a radially inner periphery and a radially outer periphery, and a plurality of fluid flow channels defined on at least some of the discs and extending from the inner periphery to the outer periphery; and sound absorbing means disposed in between at least some adjacent discs and forming a respective wall of at least a portion of the flow channels with respect to the flow channel of an adjacent disc.

In accordance with another embodiment of the present invention, a method of pressure reduction for handling of fluid comprises providing a plurality of discs stacked upon one another, each disc having a radially inner periphery and a radially outer periphery, and a plurality of fluid flow channels defined on at least some of the discs and extending from the inner periphery to the outer periphery; and inserting one or more sound reducing material elements into the disc stack disposed to extend across at least some of the fluid flow channels so that fluid flowing through the channel passes through the sound absorbing material.

In accordance with another embodiment of the present invention, a method of pressure reduction for handling of a fluid, comprises providing a plurality of adjacent discs stacked upon one another, each disc having an radially inner periphery and a radially outer periphery, and a plurality of fluid flow channels defined on at least some of the discs and extending from the inner periphery to the outer periphery; and inserting a plurality of sound absorbing wafers in between adjacent discs and forming a respective wall of at least a portion of the flow channels with respect to the flow channel of an adjacent disc.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a cut-away plan view of a disc stack according to a first preferred embodiment of the present invention.

FIG. 2 is a cross-sectional view taken through lines 2—2 in FIG. 1, also showing a valve plug as well as a top plate not seen in FIG. 1.

DETAILED DESCRIPTION

Figure 3:
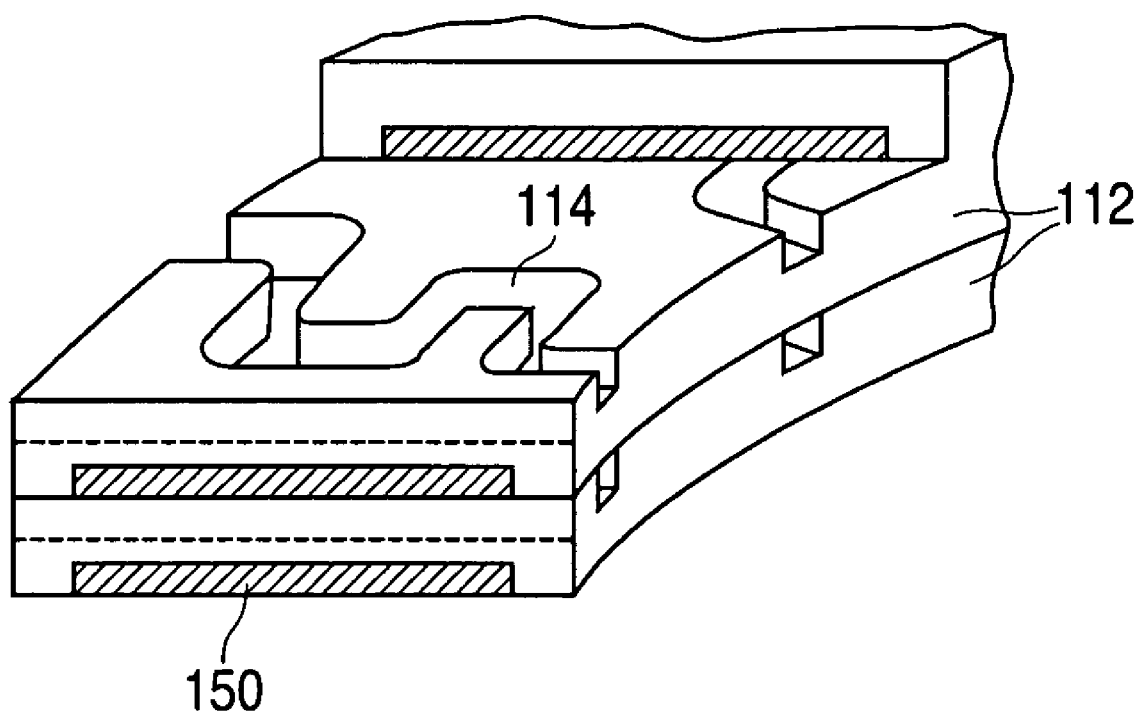
FIG. 3 is a perspective cut-away view of a second embodiment of the invention.

The present invention provides improved apparatuses and methods for reducing noise and/or providing pressure drop in a fluid handling system, which may be used with or without an associated valve plug arrangement. Preferred embodiments of the invention will now be described with references to the drawing figures, in which like reference numbers refer to like parts throughout.

In a first embodiment illustrated in FIGS. 1 and 2, a disc stack type fluid handling valve and/or trim 10 is shown. FIG. 1 is a top cut-away plan view showing a first disc 12. The disc 12 has torturous flow passages, also referred to as torturous flow paths, labeled 14, 16 or 18 as illustrated. The paths 14, 16, or 18 illustrate alternative examples of typical flow paths. In a preferred embodiment, one or the other types of torturous paths 14, 16 or 18 would usually be utilized all around the circumference of the disc. Another example of a suitable torturous path stage is shown in U.S. Pat. No. 6,161,584, titled "HIGH ENERGY LOSS FLUID CONTROL DEVICE", issued Dec. 19, 2000, the disclosure of which is hereby incorporated by reference in its entirety.

That is, the illustrated embodiment 12 shows three different exemplary types of paths 14, 16 or 18 for convenience. Some embodiments use different types of paths such as shown, while other embodiments would simply use one of the illustrated types of paths, or any other torturous path. By way of example, the type of path 14 is a relatively straight radial passage having an expanding cross-section moving radially outwardly. The type of path 16 provides for four fluid turns or pressure drop stages leading in a single collection point that then splits into two further paths that then meet at a single outlet. The type of path 18 each has a first radial portion which moves around a central block, and then extends outward to a diverting path leading to an outlet, also providing for four fluid turns.

The paths such as 14, 16 or 18 may be provided in various ways. In one embodiment, the paths are cut part way into the depth of the disc, so that a plurality of discs can be stacked on top of each other with the paths formed in between.

The paths 14, 16 and 18 lead from a central hole or bore 20 forming a radially inward edge of the stack, (which can be blocked by a movable plug 22 (see FIG. 2)), to the radially outer circumference 24 of the disc.

A feature of some preferred embodiments of the invention is the addition of a sound absorbing material insert 50 into the disc stack. In the example shown in FIGS. 1 and 2, a plurality of noise reducing valve inserts 50 have been placed into the structure as shown. The inserts 50 are disposed in axially extending curved slots in the disc stack in such a way so that all the fluid has to pass through one of the inserts 50 on its travel through the disc. Examples of appropriate sound absorbing material for the insert 50 include for example, knitted wire mesh or metal foam. Another example of material is sintered metal. Other porous materials are also suitable.

It will be appreciated that by virtue of the placement of the sound absorbing material 50, the fluid is subjected not only to a torturous, convoluted, or otherwise specially designed path via the passages 14, 16 or 18, for example, but also moves through the sound absorbing material 50 as well. The sound absorbing material 50 also in some embodiments interconnects to some extent some adjacent paths within one disc, and also in some embodiments axially connects to some extent a number of the paths between different disc stacks. This provides a further degree of complexity to the flow path, and/or pressure equalization between paths, which further can reduce noise.

In the embodiment illustrated in FIG. 1, it is seen that a number of generally C-shaped cylindrical cutout sound reducing material regions 50 are provided. The number and spacing of these regions can be modified in any desirable fashion. For example, a continuous cylindrical ring of sound absorbing material might be provided, located radially in between two metal path discs having different and inner diameters and outer diameters. On the other hand a larger number of concentric individual sound-reducing material rings, or partial rings, might be provided. Further, while in the embodiment illustrated in FIG. 1, each torturous path intersects with only one sound reducing layer 50, it will be appreciated that a greater number of sound reducing layers could be used along each torturous path. Also in some embodiments, there may be paths that do not interact with a sound-reducing plug 50.

FIG. 3 illustrates an alternative embodiment of the invention. FIG. 3 illustrates two discs 112 each having torturous paths 114 carved partially through their depths. A ring of sound absorbing material 150 resides in the channel of the bottom surface of each disc 112 as shown. It will be appreciated that each torturous path 114 thus has as part of its top enclosed surface the sound absorbing material 150. The sound absorbing material 150 can be selected from any of the materials that have been identified as suitable for use as the sound absorbing material 50 in the first embodiment.

In other words, in the embodiment of FIG. 3, one wall of at least part of the torturous path is provided by the sound absorbing material 150. In this embodiment, the fluid does not necessarily pass through the sound absorbing material as in the first embodiment, however it flows along the sound absorbing material and thus noise is suppressed when the sound energy is dissipated within and through the material. For example, in the case of knitted wire mesh used as the material 150, the sound energy causes the wires to vibrate, converting acoustical energy to thermal energy and thus reducing sound.

In the embodiment of FIG. 3, the sound absorbing material 150 is in the form of wafers inserted into a groove formed on the bottom surface of each disc, opposite of the side with the flow pattern in order to be trapped between the discs. Alternatively, the sound absorbing discs 150 could have the full diameter of the discs 112, and thus the discs 150 can be alternated with the discs 112 without residing in a channel therein.

Accordingly, some embodiments of the invention reduce sound by taking advantage of two different structural and operative features. A first feature is the provision of multi-path multi-pressure drop, velocity control flow paths, inherent with many disc stack designs which have the effect of reducing noise. Since each flow path and pressure drop can be considered a noise source, this is done by creating many lower energy noise sources in place of one high energy noise source resulting in less turbulence and noise. Using many small flow passages also has the effect of creating a frequency shift in the fluid generated noise, or valve generated noise which has the benefit of higher frequency transmission loss through the pipe wall.

Preferred embodiments of the invention also take advantage of the second feature of using a noise suppressing material such as for example a mesh material, a fibrous material, a foam material, or other porous materials to suppress noise. A material such as for example knitted wire mesh or metal foam can effectively reduce noise acting as a sound barrier when the fluid must pass through it or along it. The fluid is broken up into small flow streams producing greater restriction and velocity reduction than might be provided by a disc stack flow path without the additional sound absorbing material.

In the examples shown in FIGS. 1 and 2, one or more sound absorbing elements 50 are inserted into the stack formed by the discs 12. Each disc 12 has a flow pattern 14, 16 or 18 formed partially into one portion of the disc 12 and also has a central hole 20 through the disc so that when the discs are stacked together an element of sound absorbing material 50 can be inserted through all the discs 12, essentially along the length of the disc stack. With compressible fluids, the flow will generally be in the direction from the inside periphery 20 of the disc stack to the outside periphery 24. In the case of a valve trim, as the plug 22 is withdrawn and the disc is exposed, the fluid will be subdivided into a number of flow passages 14, 16 or 18. Before the fluid reaches the outside periphery 24, it will be forced to pass though the sound absorbing element 50. Because only a predetermined number of holes are exposed on the inside periphery 24 of the disc 12, the fluid can exit the trim through any number of holes around the outside of the trim as the fluid can pass axially, radially, and or circumferentially through the element 50 ensuring that fluid velocities are low. In some embodiments, noise is significantly reduced using noise reduction qualities that exist with both the disc stack and sound absorption techniques.

The disc stack has end caps 30 and 32 (see FIG. 2) to prevent the fluid from passing out the ends. In one preferred optional feature of this embodiment, the disc stack can be constructed so that the sound absorbing elements 50 are removable for cleaning or replacement should they become clogged with debris. That is, one or both of the end caps 30 and 32 can be removed and the sound absorbing elements 50 can be slid out for cleaning or replacement. This can provide advantages in some applications, because the sound absorbing elements 50 can also provide some degree of filtration, particle removal, or debris removal if desired.

Although the sound absorbing material 50 can be selected to reduce sound, the material could alternatively be selected for its filtration or other properties such as merely for pressure drop.

Another benefit of the removable type of sound absorbing elements 50 is that different materials or types of sound absorbing elements can be substituted for different applications. That is, the overall pressure drop and noise reducing characteristics, as well as filtration ability, clogging resistance, material compatibility, useful life, etc., of a given disc stack can be adjusted by selecting an appropriate mesh size, porosity, and the like of the sound absorbing material.

Turning to the embodiment of the FIG. 3, it will be appreciated that a number of wafers of sound absorbing material 150 are trapped with each one respectively being trapped between a pair of adjacent discs 112. The fluid passes through the passages 114 that are formed in the disc 112 surface, and the noise is reduced using the velocity control methods provided by the disc stack flow path. Further, the noise is also additionally reduced by having the sound absorbing material 150 on one surface of at least part of the flow path. The incident sound energy waves are absorbed at least to some extent by the wafer material 150 which provides a damping effect on any noise that is generated in the pressure reduction process of passing through the paths in the disc stack. The surface of the sound absorbing material may also be rough at least to some extent and in such a case will add frictional resistance to the flow path helping control the velocity of the fluid.

Figure 4:
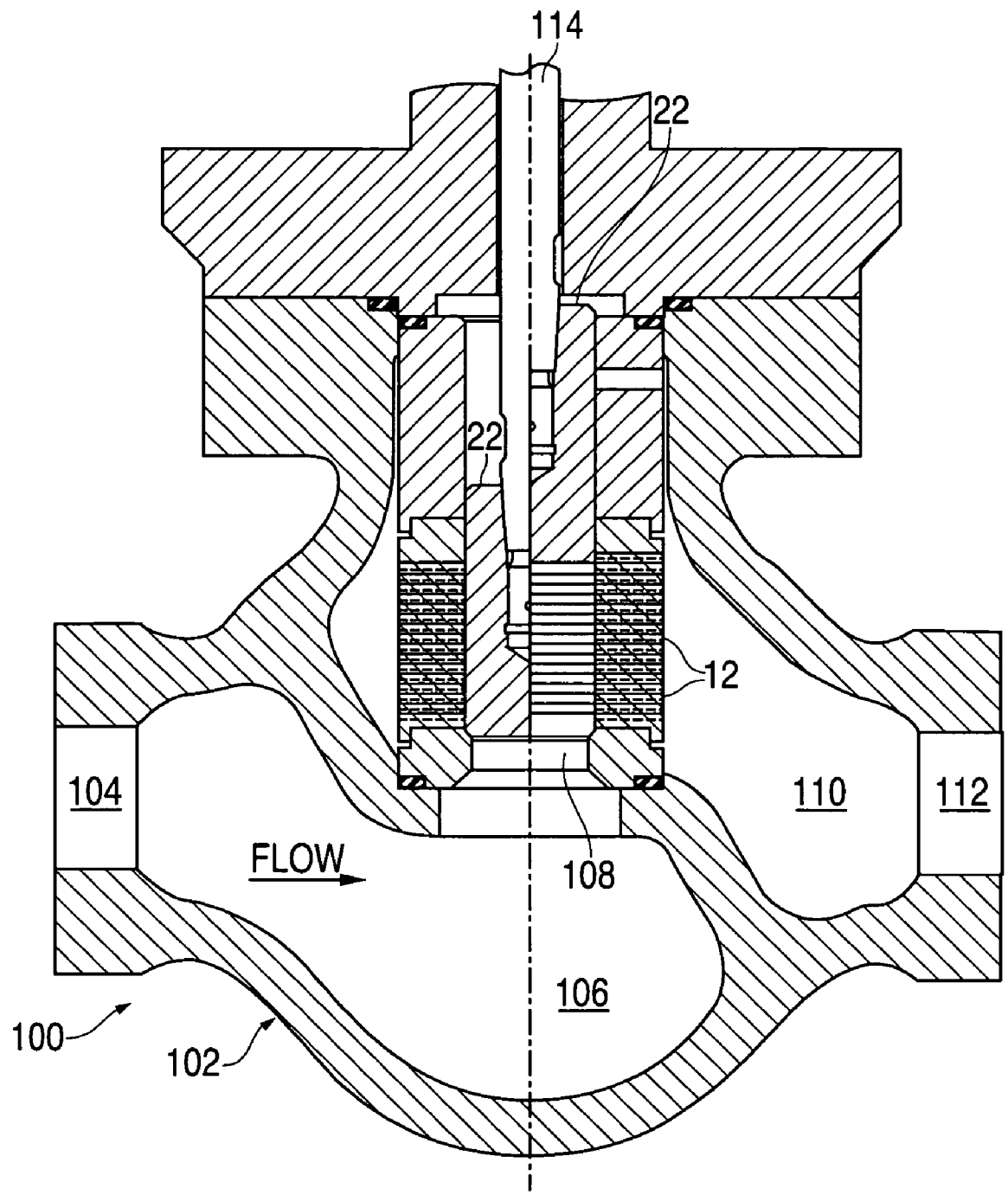
FIG. 4 is a cross-sectional view of a valve using the disc stack.

FIG. 4 is a cross-sectional view of a valve system 100 including a valve body 102 having an inlet 104 leading to a flow channel 106. An inlet region 108 at the lower part of the disc stacks leads upward into a plurality of stacked discs 12. To the left of the center line of this drawing the plug 22 is shown in a lowered or closed position and so fluid is not able to reach the paths in the discs 12. In this position the valve 100 is closed. To the right of the center line of FIG. 4, the plug 22 is shown in a fully raised position and the inner periphery of the disc 12 is visible. Fluid flows up through the inlet 108 and through the tortuous paths in each of the discs 12 and is thus able to exit into a flow region 110 and out an outlet 112. A stem 114 is shown for moving plug 22 up and down between open and closed position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pressure reducing apparatus for handling of fluid, comprising:
   a plurality of discs stacked upon one another, each disc having a radially inner periphery and a radially outer periphery, and a plurality of fluid flow channels defined on at least some of the discs and extending from the inner periphery to the outer periphery; and
   one or more sound absorbing material elements disposed in the disc stack to extend across at least some of the fluid flow channels so that fluid flowing through the channel passes through the sound absorbing material,
   wherein the sound absorbing material projects axially through a plurality of adjacent discs and blocks at least some flow channels of the plurality of discs.

2. The apparatus of claim 1, wherein the sound absorbing material is a porous material.

3. The apparatus of claim 1, wherein the sound absorbing material is one of a metal foam, a metal mesh, or sintered metal.

4. A pressure reducing apparatus for handling of fluid, comprising:
   a plurality of discs stacked upon one another, each disc having a radially inner periphery and a radially outer periphery, and a plurality of fluid flow channels defined on at least some of the discs and extending from the inner periphery to the outer periphery; and
   one or more sound absorbing material elements disposed in the disc stack to extend across at least some of the fluid flow channels so that fluid flowing through the channel passes through the sound absorbing material,
   wherein at least some discs have a perforation therethrough corresponding to the location of the sound absorbing material.

5. The pressure reducing apparatus for handling of fluid comprising:
   a plurality of adjacent discs stacked upon one another, each disc having a radially inner periphery and a radially outer periphery, and a plurality of fluid flow channels defined on at least some of the discs and extending from the inner periphery to the outer periphery; and
   a plurality of sound absorbing wafers disposed in between at least some adjacent discs and forming a respective wall of at least a portion of the flow channels with respect to the flow channel of an adjacent disc,
   wherein the sound absorbing wafers project axially through the adjacent discs and blocks at least some flow channels of the plurality of discs.

6. The apparatus of claim 5, wherein the sound absorbing wafers are a porous material.

7. The apparatus of claim 5, wherein the sound absorbing wafers are one of a metal foam, a metal mesh, or sintered metal.

8. A pressure reducing apparatus for handling of fluid, comprising:
   a plurality of discs stacked upon one another, each disc having a radially inner periphery and a radially outer periphery, and a plurality of fluid flow channels defined on at least some of the discs and extending from the inner periphery to the outer periphery and sound absorbing means disposed in the disc stack to extend across at least some of the fluid flow channels so that fluid flowing through the channel passes through the sound absorbing means,
   wherein the sound absorbing means projects axially through a plurality of adjacent discs and blocks at least some flow channels of the plurality of discs.

9. The apparatus of claim 8, wherein the sound absorbing means is a porous material.

10. The apparatus of claim 8, wherein the sound absorbing means is one of a metal foam, a metal mesh, or sintered metal.

11. A pressure reducing apparatus for handling of fluid, comprising:
    a plurality of discs stacked upon one another, each disc having a radially inner periphery and a radially outer periphery, and a plurality of fluid flow channels defined on at least some of the discs and extending from the inner periphery to the outer periphery; and
    one or more sound absorbing material elements disposed in the disc stack to extend across at least some of the fluid flow channels so that fluid flowing through the channel passes through the sound absorbing material,
    wherein each disc has a perforation therethrough corresponding to the location of the sound absorbing means.

12. A pressure reducing apparatus for handling of a fluid comprising:
    a plurality of adjacent discs stacked upon one another, each disc having a radially inner periphery and a radially outer periphery, and a plurality of fluid flow channels defined on at least to some of the discs and extending from the inner periphery to the outer periphery; and sound absorbing means disposed in between at least some adjacent discs and forming a respective wall of at least a portion of the flow channels with respect to the flow channel of an adjacent disc.

13. The apparatus of claim 12, wherein the sound absorbing means is a porous material.

14. The apparatus of claim 12, wherein the sound absorbing means is a one of a metal foam, a metal mesh, or sintered metal.

15. A method of pressure reduction for handling of fluid, comprising:

providing a plurality of discs stacked upon one another, each disc having a radially inner periphery and a radially outer periphery, and a plurality of fluid flow channels defined on at least some of the discs and extending from the inner periphery to the outer periphery; and inserting one or more sound reducing material elements into the disc stack disposed to extend across at least some of the fluid flow channels so that fluid flowing through the channel passes through the sound reducing material elements, wherein the sound reducing material elements project axially through a plurality of adjacent discs and blocks at least some flow channels of the plurality of discs.

16. The method of claim 15, wherein the sound absorbing material is a porous material.

17. The method of claim 15, wherein the sound absorbing material is one of a metal foam, a metal mesh, or sintered metal.

18. A method of pressure reduction for handling of a fluid, comprising:

providing a plurality of adjacent discs stacked upon one another, each disc having an radially inner periphery and a radially outer periphery, and a plurality of fluid flow channels defined on at least to some of the discs and extending from the inner periphery to the outer periphery; and inserting sound absorbing wafers in between at least some adjacent discs and forming a respective wall of at least a portion of the flow channels with respect to the flow channel of an adjacent disc.

19. The method of claim 18, wherein the sound absorbing material is a porous material.

20. The method of claim 18, wherein the sound absorbing material is one of a metal foam, a metal mesh, or sintered metal.

* * * * *